United States Patent

[11] 3,628,010

[72] Inventors: Niklaus Tarkoey, Oberwil; Cesare Campana, Birsfelden, both of Switzerland
[21] Appl. No.: 838,205
[22] Filed: July 1, 1969
[45] Patented: Dec. 14, 1971
[73] Assignee: Ciba-Geigy AG, Basel, Switzerland
[32] Priority: July 4, 1968
[33] Switzerland
[31] 9957/68

[54] PHOTOCHEMICAL REACTOR WITH NOZZLE MEANS TO SPRAY A REACTION LIQUID ON THE WALLS OF THE REACTOR
6 Claims, 5 Drawing Figs.

[52] U.S. Cl. .................................................. 250/43, 204/193, 250/45, 250/49
[51] Int. Cl. .................................................. H01j 37/00
[50] Field of Search .......................................... 250/43, 49; 204/193

[56] References Cited
UNITED STATES PATENTS

| | | | |
|---|---|---|---|
| 1,365,740 | 1/1921 | Snelling ..................... | 204/193 |
| 3,458,418 | 7/1969 | Beckmann ................. | 204/193 |
| 3,476,669 | 11/1969 | Beckmann et al. ........ | 204/193 |
| 3,488,148 | 1/1970 | Krincv ...................... | 204/193 |

Primary Examiner—James W. Lawrence
Assistant Examiner—C. E. Church
Attorney—Wenderoth, Lind & Ponack ABSTRACT: A photochemical reactor has an upstanding hollow cylindrical section closed at its upper end by a hemispherical dome the interior surface of which forms a continuation of the interior surface of the cylindrical section. One or more nozzles sprays a reaction liquid onto the dome to form a film thereon which moves down the interior wall of the cylindrical section. A light source is coaxially disposed in the cylindrical section and spaced from it to effect the photochemical reaction of the film. The cylindrical section may be rotated and/or longitudinally corrugated to provide a longer effective film path. The light source has a tubular lamp in a translucent or transparent envelope and means are provided for washing the outer surface of the envelope to remove contamination.

PHOTOCHEMICAL REACTOR WITH NOZZLE MEANS TO SPRAY A REACTION LIQUID ON THE WALLS OF THE REACTOR

This invention relates to a photochemical reactor.

There has already been proposed a photochemical reactor in which a light source is mounted coaxially in a cylinder which is approximately vertical. The reaction liquid is applied to the cylinder wall at the top end of the cylinder so that as uniform a film of liquid as possible is produced on the wall. This film flows downwards in contact with the wall under the action of gravity, thus maintaining a gas phase between the film and the light source.

This kind of reactor offers the advantage that owing to the presence of the gas phase between the light source and the reaction liquid there is less risk of deposits from the reaction liquid settling on the surface of the lamp. The problem with reactors of this kind is that of producing a uniform film of the reaction liquid on the inner walls of the cylinder.

In one reactor of the kind above discussed the film of the reaction liquid is produced by distributing the reaction liquid over the cylinder wall through an annular gap, the size of which is limited by the cylinder wall. A major disadvantage of this arrangement lies in the fact that this gap tends to clog since it has to be fairly narrow. Moreover the supply pressure may not exceed a given value otherwise the film produced is no longer satisfactory. As a result this particular reactor is not or only poorly suited to the exposure of heterogenous mixtures, e.g., the reaction of lead tetraacetate with alcohols. The annular gap in the larger design of reactor is particularly complicated to manufacture so that the equipment becomes appreciably more expensive. Matching the annular gap to a particular reaction liquid is associated with major difficulties in that type of reactor and these have not yet been satisfactorily solved.

It is now proposed that the reaction liquid film be formed by spraying the reaction liquid from at least one nozzle onto a surface in order to develop the film.

Accordingly the present invention provides a photochemical reactor comprising a reaction chamber having an upstanding hollow cylindrical section providing an interior wall for supporting a downwardly flowing film of a reaction liquid; a source of radiant energy located in said cylindrical section in spaced-apart relation to said interior wall for irradiating said film; and means for directing said reaction liquid onto said interior wall to form said film wherein said means comprises at least one nozzle arranged for spraying said reaction liquid received from a source of same.

In a preferred embodiment, the above-stated means for directing the reaction liquid comprises a dome closing the upper end of said upstanding cylindrical section and having an interior surface forming a continuation of said interior wall of said cylindrical section, said nozzle or at least one of said nozzles, as the case may be, being located to direct said reaction liquid onto said interior surface of said dome from which said reaction liquid flows to said interior wall of said cylindrical section. The interior surface of the dome is hemispherical and the or at least one nozzle, as the case may be, is directed toward the top of the dome.

Alternatively the reaction liquid could be sprayed onto an upper portion of the interior wall of the cylindrical section.

It has been found that the nozzle(s) used to create the film of the reaction liquid is or are far less prone to clogging than the annular gap referred to above and they can be designed to be detachably mounted to conduit and replaceable at comparatively low cost. In the case of reactors of the invention employing several nozzles, these or their connecting pipes can be constructed so that they can be switched on and off individually or in groups. A simple control can then adapt the reactor to the required reaction, the film being adjusted to an optimum thickness.

A preferred feature of the invention is that the source of radiant energy comprises an elongate lamp disposed coaxially of the cylindrical section of the reactor and enclosed in a translucent or transparent envelope. There is provided means (preferably one or more detachably mounted spray nozzles) for directing a liquid onto the surface of the envelope facing the interior wall of the cylindrical section to wash the envelope surface. In this manner volatile substances which might reach the surface of the envelope from the reaction liquid film through the intervening gas space can be washed off, before a harmful deposit could build up which could reduce the amount of light available. Washing is best carried out intermittently using the solvent for the reaction.

In order that the invention and the manner of putting it into practice may be better understood, embodiments of the invention will now be described, by way of example, with reference to the accompanying drawings in which.

In the FIGURES, like parts are given like reference numerals.

Figure 1:
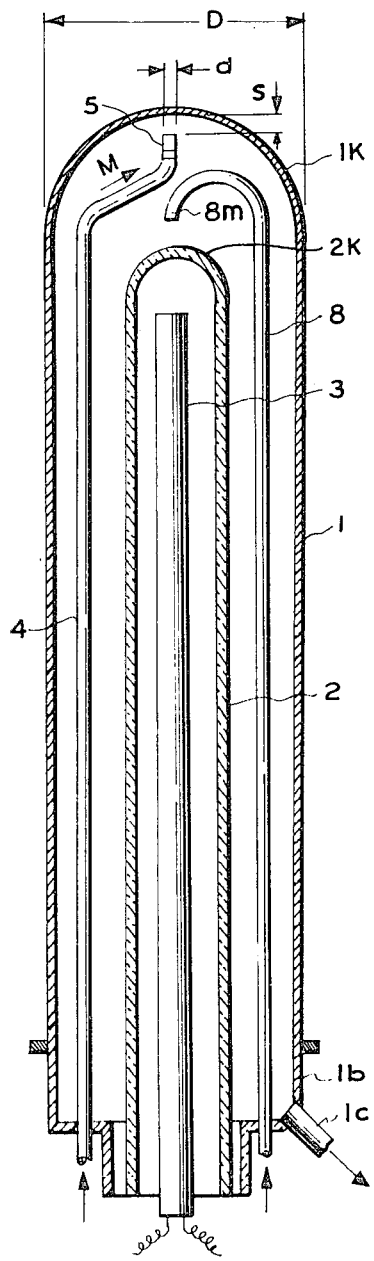
FIG. 1 shows, in an axial cross section, a first embodiment of the invention with a single nozzle feed for the reaction liquid.

Referring to FIG. 1 the reactor depicted consists of two coaxial circular, hollow, cylinders 1 and 2, both of which are closed off at the top by a cylinder head section in the form of a hemispherical dome $1k$ and $2k$. The closed off outer cylinder provides a reaction chamber and the inner cylinder 2 is a transparent or translucent envelope and encloses a light source comprising a tubular lamp 3. A photochemical reaction is effected by running a film of a liquid reaction down the inner surface of the cylinder 1 where it is under the influence of the light from lamp 3.

A feed for the reaction liquid is provided through a pipe or conduit 4 ending in a nozzle 5 which is detachably mounted to pipe 4 to allow replacement of the nozzle. This nozzle is directed against the top of the hemispherical inner surface of the dome $1k$ of the reaction chamber. The inner surface of the dome $1k$ forms a continuation of the interior wall of cylinder 1. The liquid reaction directed against the dome by the nozzle 5 coats the dome with a cohesive film which is then directed to, and flows continuously down, the inner wall of the cylinder 1. An optimum film can be obtained by suitably controlling the pressure of the reaction liquid or of the feed pressure and by careful selection of the nozzle cross section. The outer cylinder is closed at the bottom by the cup-shaped base $1b$ coupled to cylinder 1 by a flange connection. The base $1b$ is equipped with a drain $1c$ for the exposed reaction product. The product to be exposed can also be fed through the reactor several times (recirculation), effective length of film being extendable to almost any value. Several such reactors can of course be connected in series or in parallel.

The reactor represented in FIG. 1 is also equipped with a washing tube 8 extending upwardly through the base $1b$ and terminating in an opening $8m$ directed onto the outside of the dome $2k$ of the inner cylinder 2. The opening $8m$ is in practice a spray nozzle detachably mounted to the tube 8 to allow replacement of the nozzle. The washing liquid sprayed onto dome $2k$ runs down the surface of cylinder 2 and ensures that the surface of the inner cylinder facing the interior wall of cylinder 1 can be washed down as necessary so that deposits of volatile substances from the film of the reaction liquid can be removed. The washing process is best carried out with the solvent for the reaction.

Figure 2:
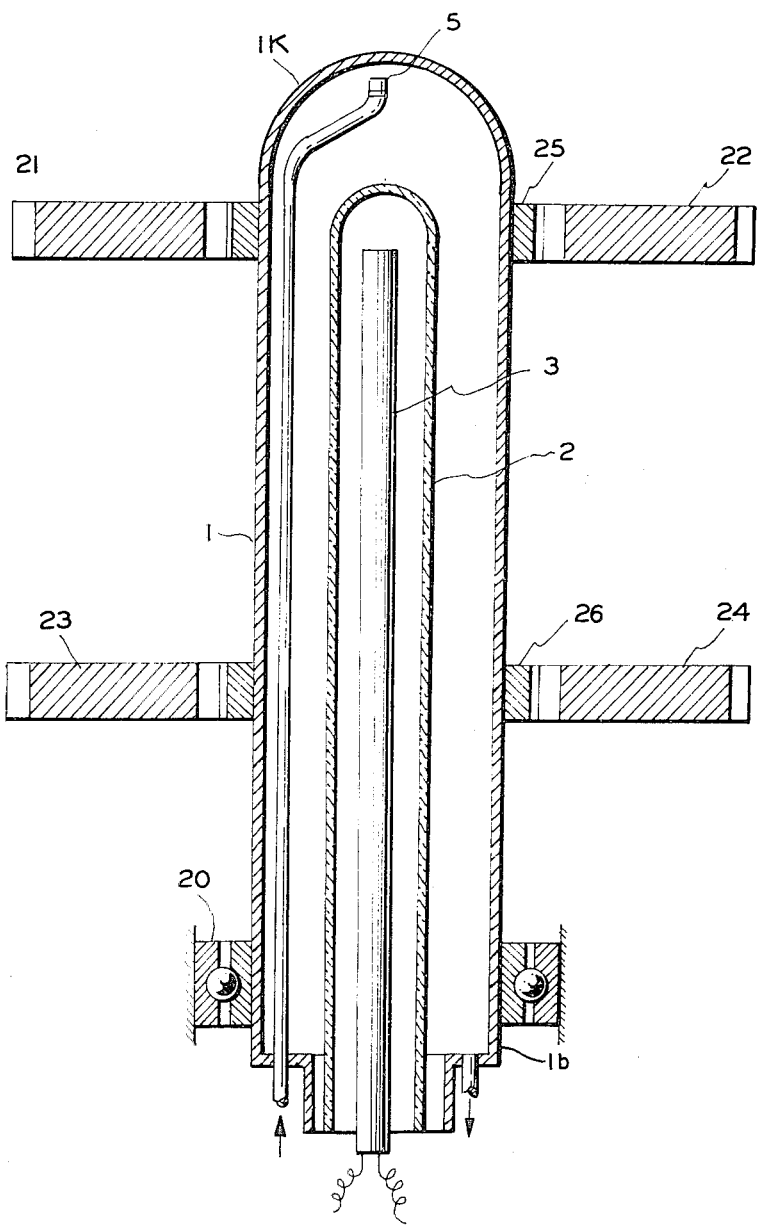
FIG. 2 shows a modified form of the embodiment of FIG. 1 also in axial cross section.
Figure 3:
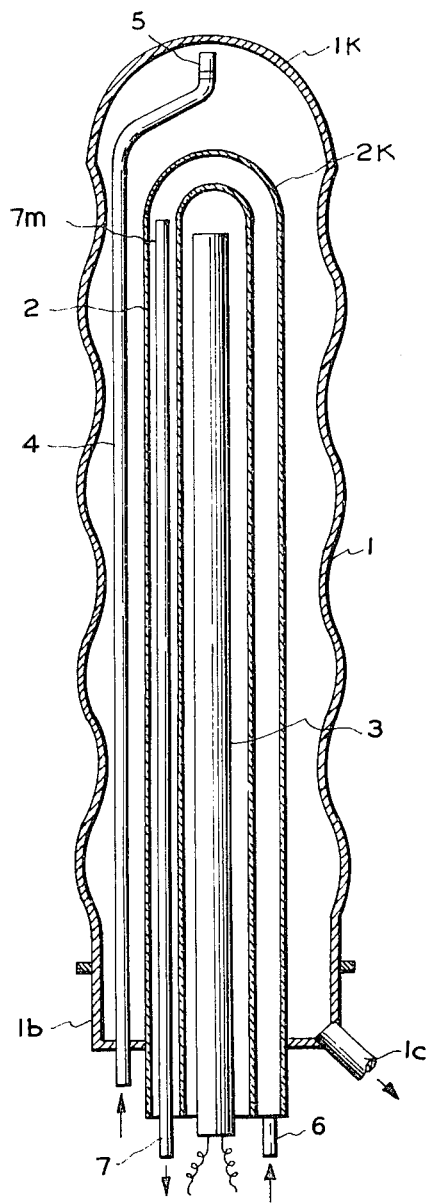
FIG. 3 shows a further modified form of the embodiment of FIG. 1, also in axial cross section.

In order to lengthen the time spent by the reaction liquid in the reactor, the cylinder section 1 of the reactor can be designed to rotate about its longitudinal axis and/or its interior walls on which the film is formed could be corrugated. FIG. 2 and 3 show an example of each, the same parts being numbered as in FIG. 1.

In the reactor of FIG. 2 the cylinder 1 can rotate in the bearing 20 which surrounds the cup-shaped base 1b. A motor (not shown) drives the cylinder through gears sets 21, 22, 25 and 23, 24, 26, gear wheels 25 and 26 being fixedly mounted to the outside of cylinder 1 and the remaining gear wheels being driven in any convenient fashion by the motor. The speed of rotation can be increased to the point where centrifugal force on the reaction liquid film considerably increases the time taken by a given portion of the film to flow down the reactor. FIG. 2 does not show the use of a washing arrangement as shown in FIG. 1 but this feature can of course be provided if required.

FIG. 3 shows a modification of the reaction chamber in which the wall of the cylinder 1 is longitudinally corrugated, i.e., the corrugations themselves run transversely of the cylinder axis so that the cylinder has the shape of a bellows. The corrugated cylinder can also be arranged for rotation like the variant shown in FIG. 2; by appropriately raising the rotation speed, the time spent by the reaction liquid in the reactor against the cylinder wall or in the dips between corrugations can be extended.

A further modification, applicable to both FIGS. 1 and 2, is shown in FIG. 3. Here the inner cylinder 2 is in the form of a double envelope. A cooling and/or filtering medium, especially one in liquid form, can be circulated through the double envelope of the inner cylinder 2. The feed can take place via a lower connection 6 to the space between the envelope walls and the return through a pipe 7 extending between same. The inlet end 7m of the pipe 7 is located in the upper part of the double envelope. If the cylinder 2 is provided with a washing arrangement such as has been described with reference to FIG. 1, the arrangement directs the washing liquid onto the outer surface of the outer wall of the double envelope.

Figure 4:
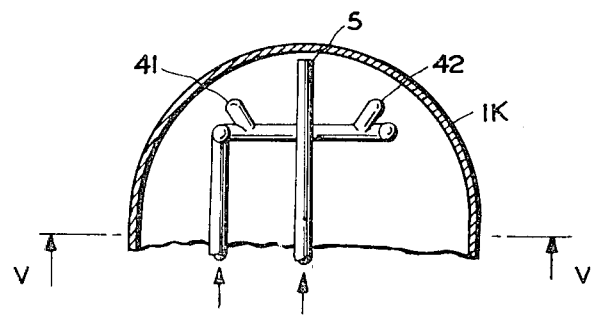
FIG. 4 illustrates a detail in axial cross section of a variant applicable to the embodiment of FIGS. 1 to 3 to provide then with a multinozzle feed for the reaction liquid.

Instead of, or additional to, the single reaction liquid nozzle 5 so far described, other nozzles can be directed against the cylinder wall 1 or the dome 1k. Such a design variant can be seen in FIGS. 4 and 5. The nozzle directed against the top of the dome 1k is again designated with the FIG. 5. As shown four more nozzles 41, 42, 43 and 44 are evenly distributed along an annular pipe 40, i.e., equiangularly distributed about the axis of cylinder 1 in addition to the central nozzle 5 on the cylinder axis. As can best be seen in FIG. 4, the four additional nozzles are directed upwardly, though inclined to the cylinder axis, to direct the reaction liquid against the inner surface of dome 1k. The feeds to nozzle 5 and the annular pipe 40 can be switched on and off together or separately by means of valves which are not shown. In all the embodiments the nozzles are located close to the interior surface of the dome.

The practical application of the invention is not limited to the design variants described thus far. The film could, for instance, be produced by having a single inclined (that is relative to the vertical cylinder axis) or horizontal rotating nozzle whose center of rotation coincides with the reactor chamber center line (i.e., axis of cylinder 1). The feed to this nozzle is then best connected centrally through the top of the reactor.

In designing and operating photochemical reactors based on the invention the satisfactory creation of the film against the cylinder wall not only depends on the viscosity of the reaction liquid but also on the nozzle diameter, the distance between the nozzle and the wall and also on the pressure of the liquid or the rate of flow. Practical tests have, rather surprisingly, proved that these values are not especially critical. This result is illustrated by a set of tables numbered 1 to 10 on the following pages which are for a reactor based on the design shown in FIG. 1;

Tables 1 to 5 are for a reactor in which the cylinder 1 had an internal diameter D of 200 mm. Tables 6 to 10 relate to a reactor in which the internal diameter of the cylinder 1 was 300 mm.

Figure 5:
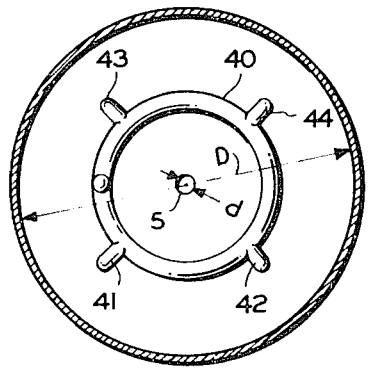
FIG. 5 is a section along the line V—V in FIG. 4.

The following designations are also used in the tables: $d$ for the nozzle diameter, $s$ for the distance between the nozzle opening and the cylinder wall or dome and M for the rate of flow. These dimensions are illustrated in FIGS. 1 and 5. Water (instead of a reaction liquid) was chosen as the test liquid. The formation of a satisfactory film is shown by a "+" symbol at the appropriate table entry. An unsatisfactory film is shown by the symbol "−".

Reactor with internal cylinder diameter D=200 mm.

M=5 liters/min.

| $s$ in mm. | $d$ in mm. | | | | |
|---|---|---|---|---|---|
|  | 5 | 5 | 10 | 50 | 100 |
| 5 | + | + | + | + | + |
| 10 | + | + | + | − | − |
| 15 | + | − | − | − | − |
| 20 | + | − | − | − | − |
| 25 | + | − | − | − | − |
| 30 | − | − | − | − | − |

(1)

M=10 liters/min.

| $s$ in mm. | $d$ in mm. | | | | |
|---|---|---|---|---|---|
|  | 5 | 5 | 10 | 50 | 100 |
| 5 | + | + | + | + | + |
| 10 | + | + | + | + | − |
| 15 | + | + | + | − | − |
| 20 | + | + | − | − | − |
| 25 | + | − | − | − | − |
| 30 | + | − | − | − | − |

(2)

M=15 liters/min.

| $s$ in mm. | $d$ in mm. | | | | |
|---|---|---|---|---|---|
|  | 5 | 5 | 10 | 50 | 100 |
| 5 | + | + | + | + | + |
| 10 | + | + | + | + | + |
| 15 | + | + | + | − | − |
| 20 | + | + | − | − | − |
| 25 | + | + | − | − | − |
| 30 | + | − | − | − | − |

(3)

M=20 liters/min.

| $s$ in mm. | $d$ in mm. | | | | |
|---|---|---|---|---|---|
|  | 5 | 5 | 10 | 50 | 100 |
| 5 | + | + | + | + | + |
| 10 | + | + | + | + | + |
| 15 | + | + | + | − | − |
| 20 | + | + | + | − | − |
| 25 | + | + | − | − | − |
| 30 | + | − | − | − | − |

(4)

M=25 liters/min.

| $s$ in mm. | $d$ in mm. | | | | |
|---|---|---|---|---|---|
|  | 5 | 5 | 10 | 50 | 100 |
| 5 | + | + | + | + | + |
| 10 | + | + | + | + | + |
| 15 | + | + | + | − | − |
| 20 | + | + | + | − | − |
| 25 | + | + | + | − | − |
| 30 | + | + | − | − | − |

Reactor with internal cylinder diameter D=300 mm.

(5)

M=5 liters/min.

| s in mm. | d in mm. | | | | |
|---|---|---|---|---|---|
| | 5 | 5 | 10 | 50 | 100 |
| 5 | − | − | − | − | − |
| 10 | − | − | − | − | − |
| 15 | − | − | − | − | − |
| 20 | − | − | − | − | − |
| 25 | − | − | − | − | − |
| 30 | − | − | − | − | − |

(6)

M=10 liters/min.

| s in mm. | d in mm. | | | | |
|---|---|---|---|---|---|
| | 5 | 5 | 10 | 50 | 100 |
| 5 | − | − | − | − | − |
| 10 | − | + | + | − | − |
| 15 | + | − | − | − | − |
| 20 | − | − | − | − | − |
| 25 | − | − | − | − | − |
| 30 | − | − | − | − | − |

(7)

M=15 liters/min.

| s in mm. | d in mm. | | | | |
|---|---|---|---|---|---|
| | 5 | 5 | 10 | 50 | 100 |
| 5 | + | − | − | − | − |
| 10 | + | + | + | + | + |
| 15 | + | + | + | − | − |
| 20 | + | − | − | − | − |
| 25 | − | − | − | − | − |
| 30 | − | − | − | − | − |

(8)

M=20 liters/min.

| s in mm. | d in mm. | | | | |
|---|---|---|---|---|---|
| | 5 | 5 | 10 | 50 | 100 |
| 5 | + | − | − | − | − |
| 10 | + | + | + | + | + |
| 15 | + | + | + | − | − |
| 20 | + | + | − | − | − |
| 25 | + | − | − | − | − |
| 30 | + | − | − | − | − |

(9)

M=25 liters/min.

| s in mm. | d in mm. | | | | |
|---|---|---|---|---|---|
| | 5 | 5 | 10 | 50 | 100 |
| 5 | + | − | − | − | − |
| 10 | + | + | + | + | + |
| 15 | + | + | + | − | − |
| 20 | + | + | + | − | − |
| 25 | + | − | − | − | − |
| 30 | + | − | − | − | − |

(10)

What is claimed is:

1. A photochemical reactor comprising a reaction chamber having an upstanding hollow cylindrical section providing an interior wall for supporting a downwardly flowing film of a reaction liquid; a source of radiant energy located in said cylindrical section in spaced-apart relation to said interior wall for irradiating said film; means for directing said reaction liquid onto said interior wall to form said film, said means comprising at least one nozzle arranged for spraying said reaction liquid received from a source of same; and a drain in said reaction chamber operatively positioned to prevent the collection of said reaction liquid; said directing means further comprising a dome closing the upper end of said upstanding cylindrical section and having an interior surface forming a continuation of said interior wall of said cylindrical section, said nozzle or at least one of said nozzles, as the case may be, being located to direct said reaction phase onto said interior surface of said dome from which said reaction phase flows to said interior wall of said cylindrical section.

2. A photochemical reactor as claimed in claim 1, wherein said interior surface of said dome is hemispherical.

3. A photochemical reactor as claimed in claim 1 wherein said nozzle is directed toward the top of said dome.

4. A photochemical reactor comprising a reaction chamber having an upstanding, hollow cylindrical section providing an interior wall for supporting a downwardly flowing film of a reaction liquid; a source of radiant energy located in said cylindrical section in spaced-apart relation to said interior wall for irradiating said film; means for directing said reaction liquid onto said interior wall to form said film, said means comprising at least one nozzle arranged for spraying said reaction liquid received from a source of same; and a drain in said reaction chamber operatively positioned to prevent the collection of said reaction liquid; said directing means further comprising a plurality of nozzles and a dome closing the upper end of said upstanding cylindrical section, said dome having an interior surface forming a continuation of said interior wall of said cylindrical section, one of said nozzles being mounted to a conduit separately from the remainder and being directed toward the top of said dome.

5. A photochemical reactor comprising a reaction chamber having an upstanding, hollow cylindrical section providing an interior wall for supporting a downwardly flowing film of a reaction liquid; a source of radiant energy located in said cylindrical section in spaced-apart relation to said interior wall for irradiating said film; means for directing said reaction liquid onto said interior wall to form said film, said means comprising at least one nozzle arranged for spraying said reaction liquid received from a source of same; and a drain in said reaction chamber operatively positioned to prevent the collection of said reaction liquid; said interior wall of said cylindrical section being longitudinally corrugated.

6. A photochemical reactor as claimed in claim 5 comprising a bearing arrangement to which said cylindrical section is mounted for rotation about its longitudinal axis.

* * * * *